United States Patent
Chung et al.

(10) Patent No.: US 7,477,804 B2
(45) Date of Patent: Jan. 13, 2009

(54) IMAGE INTERPOLATION APPARATUS AND METHOD

(75) Inventors: Hwe-Ihn Chung, Gyeonggi-do (KR); Yong-In Han, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 735 days.

(21) Appl. No.: 10/987,615

(22) Filed: Nov. 12, 2004

(65) Prior Publication Data
US 2005/0105830 A1 May 19, 2005

(30) Foreign Application Priority Data
Nov. 13, 2003 (KR) .................. 10-2003-0080303

(51) Int. Cl.
*G06K 9/32* (2006.01)
(52) U.S. Cl. .................. 382/300; 345/606; 345/668
(58) Field of Classification Search .................. 382/300
See application file for complete search history.

(56) References Cited

U.S. PATENT DOCUMENTS

| | | | | |
|---|---|---|---|---|
| 5,054,100 A | * | 10/1991 | Tai | 382/300 |
| 5,467,439 A | * | 11/1995 | Lee et al. | 345/668 |
| 5,875,268 A | | 2/1999 | Miyake | 382/276 |
| 6,009,213 A | * | 12/1999 | Miyake | 382/300 |
| 6,408,109 B1 | * | 6/2002 | Silver et al. | 382/300 |
| 6,810,156 B1 | * | 10/2004 | Itoh | 382/300 |
| 7,043,091 B2 | * | 5/2006 | Michel | 382/266 |
| 2003/0038817 A1 | * | 2/2003 | Kawamura et al. | 345/606 |

FOREIGN PATENT DOCUMENTS

| | | |
|---|---|---|
| KR | 1999-011449 | 2/1999 |
| KR | 10-0311472 | 9/2001 |
| KR | 2001-0099671 | 11/2001 |
| TW | 484321 | 4/2002 |

OTHER PUBLICATIONS

Preliminary Notice of First Office Action, issued Nov. 16, 2006 in counterpart Tawain Application No. 093133627.

* cited by examiner

*Primary Examiner*—Samir A Ahmed
*Assistant Examiner*—Aklilu k Woldermariam
(74) *Attorney, Agent, or Firm*—Mills & Onello, LLP

(57) ABSTRACT

The present invention is an interpolation device and method. According to the present invention, a plurality of pixels close to a pixel to be interpolated are sequentially set to a central pixel. When a pixel difference closest to a threshold value among pixel differences between the central pixel and a plurality of pixels around the central pixel belongs to a quasi-edge decision range, an edge interpolation and a bilinear interpolation are mixed to interpolate the pixel to be interpolated. As a result, it is possible to prevent reduction in image quality due to an edge verdict caused by unstable input image signal and perform a stable interpolation operation.

16 Claims, 10 Drawing Sheets

Fig. 8
Case 1 : Corner
(a) 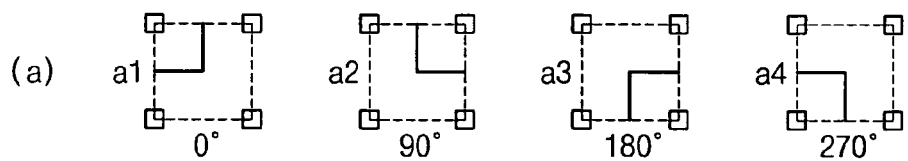
Case 2 : Perpendicular
(b) 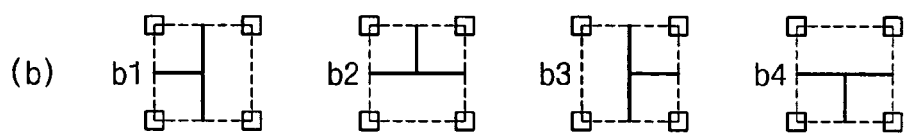
Case 3 : Full Line
(c) 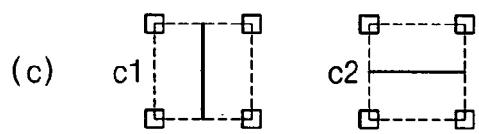
Case 4 : Cross Bar
(d) 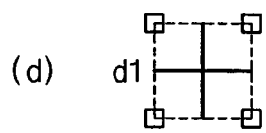
Case 5 : Half Line
(e) 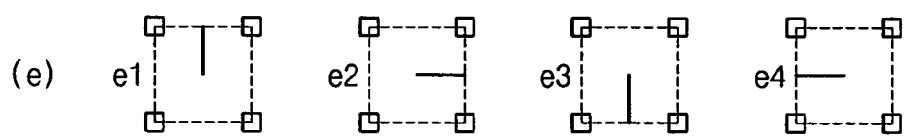
Case 5 : Diagonal
(f) 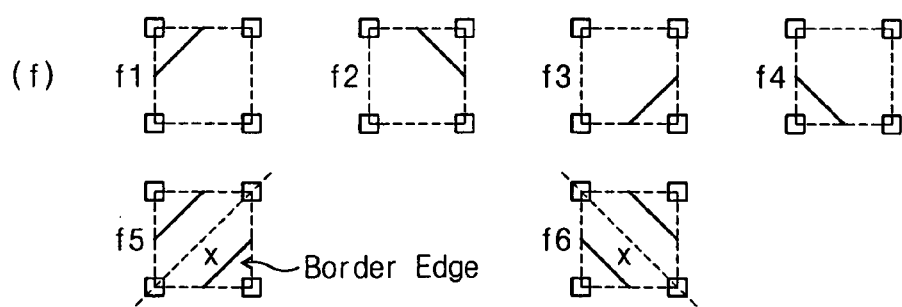

Fig. 10

| case \ weight | WNW | WNE | WSW | WSE |
|---|---|---|---|---|
| (a) PNW·CX─•PNE, CY, X, PSW·──•PSE | TX*TY | (1-WNW)*C_CY | (1-WNW)*C_CX | (1-WNW)*(CX+CY-1) |
| (b) | TX*TY | C_TX*C_CY | TX*C_TY | C_TX*Y |
| (c) | TX*C_CY | C_TX*C_CY | TX*CY | C_TX*Y |
| (d) | TX*TY | C_TX*TY | TX*C_TY | C_TX*C_TY |
| (e) A, Z, B | TX*C_CY | C_TX*C_CY | C_CX*CY | CX*CY |
| (f) | if (CX+CY) > 1, then 0; if (CX+CY) ≤ 1, then T(X+Y) | if (CX+CY) > 1, then C_CY; if (CX+CY) ≤ 1, then (1-WNW)*(1+CX-CY)/2 | if (CX+CY) > 1, then C_CX; if (CX+CY) ≤ 1, then (1-WNW)*(1-CX+CY)/2 | if (CX+CY) > 1, then CX+CY-1; if (CX+CY) ≤ 1, then 0 |

IMAGE INTERPOLATION APPARATUS AND METHOD

BACKGROUND OF THE INVENTION

RELATED APPLICATION

This application relies for priority on Korean patent application number 2003-80303, filed in the Korean Intellectual Property Office on Nov. 13, 2003, the contents of which are incorporated herein in their entirety by reference.

1. Field of this Invention

The invention relates to image signal processor systems and more particularly, to an image signal processor system for interpolating with edge information in order to extend an image signal.

2. Description of Prior Art

Generally, interpolations have been used to perform a zoom function for extending image signals. Image signals are classified as signals constructed with only natural image and image signals being mixed with the natural image and text or graphics.

Recently, as multimedia personal computers (PC) have been widely used, image processes are performed with respect to complex images such as the image signal mixed with the natural image and text or graphics. In order to extend images, linear interpolation methods have been generally used in recent years. However, in the case in which only a linear interpolation method is used, there is a problem of weak edge information. Accordingly, it is necessary to maintain the sharpness of edges in a region where edge information such as graphics or text is a main factor. For this, edge information for performing a suitable process by segmenting graphics or text regions and natural image region is needed.

Linear interpolation has advantages and disadvantages in an extended image. Noise is reduced in the natural image region, but edge information is not efficiently expressed in the graphic region. The reason for this is that the linear interpolation method does not consider edge components.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIG. 8 illustrates a central edge model and a rotation angle.

FIG. 10 illustrates a calculation process of edge interpolation coefficients with respect to the central edge model.

SUMMARY OF THE INVENTION

Figure 1:
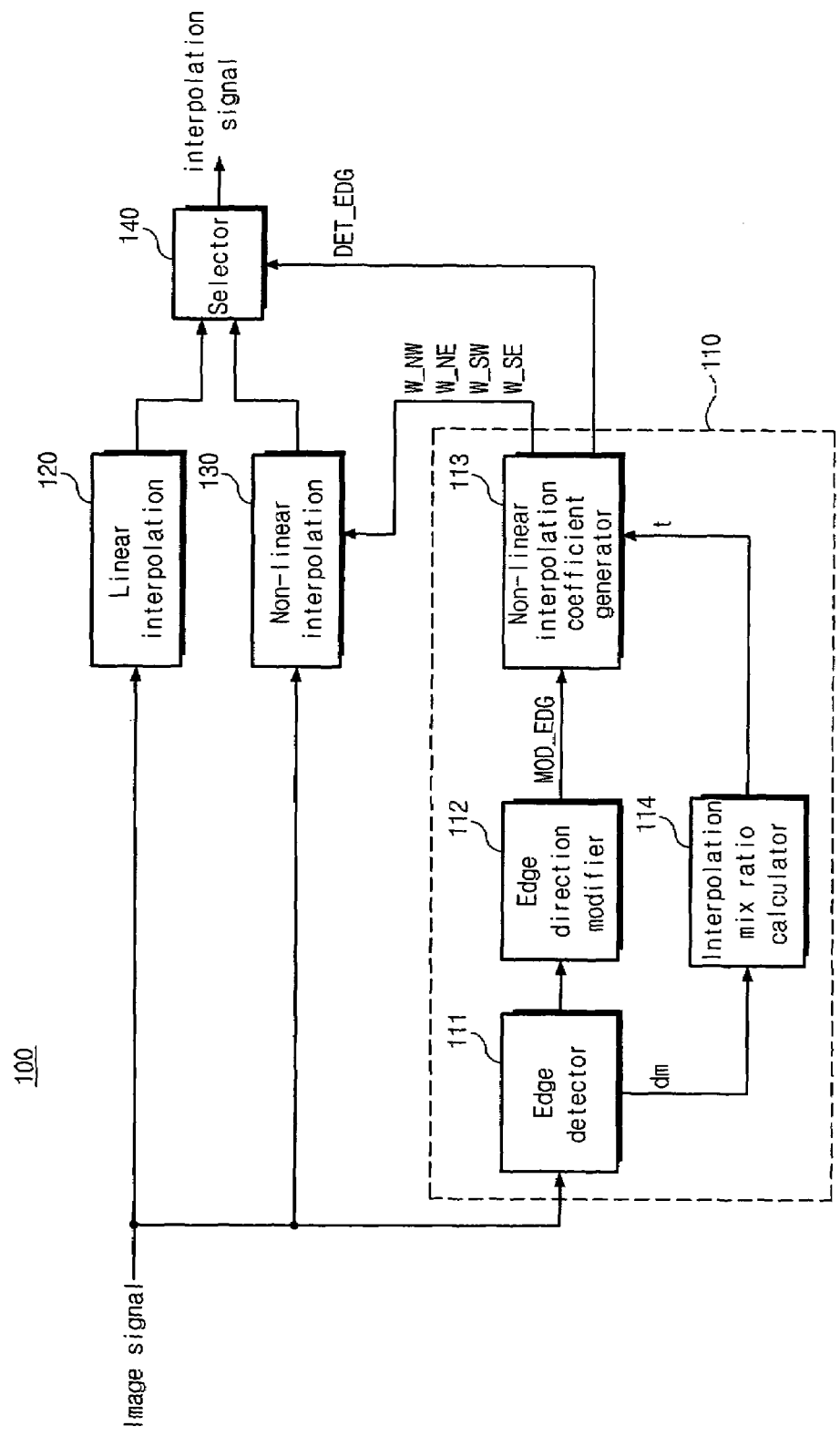
FIG. 1 is a schematic block diagram of an image signal interpolation device according to a preferred embodiment of the present invention.

One feature of the present invention is to provide an image interpolation device for detecting an edge of a graphic or a text to interpolate it.

Another feature of the present invention is to provide an image interpolation device capable of stably interpolating it from an unstable input image signal.

According to one feature of the present invention, an interpolation method comprises: sequentially setting a plurality of pixels close to a pixel to be interpolated to a central pixel; calculating pixel differences between the central pixel and a plurality of pixels around the central pixel; based on the pixel differences, determining whether the central pixel is in a quasi-edge decision range, the central pixel being in the quasi-edge decision range when the pixel difference closest to a predetermined pixel difference threshold indicates that the central pixel is in the quasi-edge decision range; and, if the central pixel is in the quasi-edge decision range, performing an interpolation, the interpolation comprising a mix of an edge interpolation and a bilinear interpolation.

In a preferred embodiment, in performing the interpolation, the mixing ratio of the edge interpolation and the bilinear interpolation is determined according to the difference value between a pixel difference closest to the threshold value among the pixel differences and the threshold value.

In one embodiment, the threshold value is one of a minimum threshold value and a maximum threshold value.

In one embodiment, the quasi-edge decision range is larger than the minimum lowest limit value and smaller than the minimum upper value at the center of the minimum threshold value.

In one embodiment, when the pixel difference closest to the minimum threshold value among the pixel differences is larger than the minimum lowest limit value and smaller than the minimum upper value, the mixing ratio is (TH_L+LU−dm)*m where, TH_L represents the minimum threshold value, LU represents the minimum upper limit value, dm represents a pixel difference closest to the minimum threshold value, and m represents a roll-off of the upper limit value and the lowest limit value.

In one embodiment, the quasi-edge decision range is larger than the maximum lowest limit value and smaller than maximum upper limit value at the center of the maximum threshold value.

In one embodiment, when the pixel difference closest to the maximum threshold value among the pixel differences is larger than the maximum lowest limit value and smaller than the maximum upper value, the edge interpolation ratio is (TH_H+HL−dm)*m where, TH_H represents the maximum threshold value, HL represents the lowest limit value, dm represents a pixel difference closest to the maximum threshold value, and m represents a roll-off of the upper limit value and the lowest limit value.

In a preferred embodiment, the edge interpolation calculates a pixel value of the pixel to be interpolated from a pixel value of four pixels close to the pixel to be interpolated and edge interpolation coefficients corresponding to the four close pixels.

In this embodiment, the pixel value of the interpolation pixel is PNW*(W_NW)+PNE*(W_NE)+(W_SW)+PSE*(W_SE)

where, PNW, PNE, PSW and PSE are four pixels close to the pixel to be interpolated, and W_NW, W_NE, W_SW and W_SE are interpolation coefficients respectively corresponding to the four close pixels.

In this embodiment, the interpolation coefficients W_NW, W_NE, W_SW and W_SE are $$W\_NW = t(WNWE) + (1-t)WNWB$$

$$W\_NE = t(WNEE) + (1-t)WNEB$$

$$W\_SW = t(WSWE) + (1-t)WSWB$$

$$W\_SE = t(WSEE) + (1-t)WSEB$$

where, t represents the mixing ratio, WNWE, WNEE, WSWE and WSEE are edge interpolation coefficients, WNWB, WNEB, WSWB and WSEB are bilinear interpolation coefficients, and the bilinear interpolation coefficients are $$WNWB = (1-KX)*(1-KY)$$

$$WNEB = KX*(1-KY)$$

$$WSWB = (1-KX)*KY$$

$$WSEB = KX*KY$$

where, KX and KY are respectively a position of a pixel to be interpolated.

According to another feature of the present invention, an interpolation method comprises sequentially setting a plurality of pixels close to a pixel to be interpolated to a central pixel. Pixel differences between the central pixel and a plurality of pixels around the central pixel are calculated. An interpolation ratio is calculated when a pixel defference closest to a threshold value among the pixel defferences belongs to a quasi-edge decision range. An interpolation coefficient is calculated based on the interpolation ratio. The pixel to be interpolated is interpolated based on the interpolation coefficient when an adge exists between the interpolation pixel and the close pixels.

In a preferred embodiment, four pixels around the pixel to be interpolated are sequentially set to the central pixel.

In a preferred embodiment, pixel differences between the central pixel and eight pixels around the central pixel are respectively calculated.

In a preferred embodiment, the threshold value is the maximum threshold value or minimum threshold value.

In this embodiment, when the threshold value is the minimum threshold value, the first quasi-edge verdict range is larger than the minimum lowest limit value and smaller than the minimum upper limit value at the center of the minimum threshold value. When the threshold value is the maximum threshold value, the second quasi-edge decision range is larger than the maximum lowest limit value and smaller than the maximum upper limit value at the center of the maximum threshold value.

In this embodiment, when the pixel difference closest to the minimum threshold value among the pixel differences is larger than the minimum lowest limit value and smaller than the minimum upper value, the mixing ratio is $$(TH\_L + LU - dm)*m$$

where, TH_L represents the minimum threshold value, LU represents the minimum upper limit value, dm represents a pixel difference closest to the minimum threshold value, and m represents a roll-off of the upper limit value and the lowest limit value.

In this embodiment, when the pixel difference closest to the minimum threshold value among the pixel differences is larger than the minimum lowest limit value and smaller than the maximum upper value, the edge interpolation ratio is $$(TH\_H + HL - dm)*m$$

where, TH_H represents the maximum threshold value, HL represents the lowest limit value, dm represents a pixel difference closest to the maximum threshold value, and m represents a roll-off of the upper limit value and the lowest limit value.

In this embodiment, the pixel value of the pixel to be interpolated is PNW*(W_NW)+PNE*(W_NE)+PSW*(W_SW)+PSE*(W_SE)

where, PNW, PNE, PSW and PSE are four pixels close to the pixel to be interpolated, and W_NW, W_NE, W_SW and W_SE are interpolation coefficients, which are calculated in the step of calculating the interpolation coefficient.

In this embodiment, the interpolation coefficients W_NW, W_NE, W_SW and W_SE are $$W\_NW = t(WNWE) + (1-t)WNWB$$

$$W\_NE = t(WNEE) + (1-t)WNEB$$

$$W\_SW = t(WSWE) + (1-t)WSWB$$

$$W\_SE = t(WSEE) + (1-t)WSEB$$

where, t represents a mixing ratio calculated in the step of calculating the mixing ratio, WNWE, WNEE, WSWE and WSEE are edge interpolation coefficients calculated from a position of a coordinate transformation of the pixel to be interpolated, WNWB, WNEB, WSWB and WSEB are bilinear interpolation coefficients, and the bilinear interpolation coefficients are $$WNWB = (1-KX)*(1-KY)$$

$$WNEB = KX*(1-KY)$$

$$WSWB = (1-KX)*KY$$

$$WSEB = KX*KY$$

where, KX and KY are respectively a position of a pixel to be interpolated.

In this embodiment, the mixing ratio (t) is 1 in case that a pixel difference closest to the minimum threshold value among the pixel differences is the same as or smaller than the minimum lowest limit value. The mixing ratio (t) is 0 in case that a pixel difference closest to the minimum threshold value among the pixel differences is smaller than the maximum lowest limit value.

In this embodiment, in case that a pixel difference closest to the maximum threshold value among the pixel differences is larger than or the same as the maximum upper limit value, the mixing ratio (t) is 1. In case that a pixel difference closest to the maximum threshold value among the pixel differences is larger than the maximum upper limit value, the mixing ratio (t) is 0.

In a preferred embodiment, a step of linearly interpolating is further included when an edge does not exist between the pixel to be interpolated and the close pixel.

According to still another feature of the present invention, an interpolation device comprises an edge detector for sequentially setting a plurality of pixels close to a pixel to be interpolated and calculating pixel differences between a central pixel and a plurality of pixels around the central pixel to detect an edge between the pixel to be interpolated and the close pixels; an interpolation mix ratio calculator for calculating an interpolation mix ratio when a pixel difference closest to a threshold value among the pixel differences belongs to a quasi-edge decision range; and a non-linear interpolator for interpolating the pixel to be interpolated by mixing an edge interpolation and a bilinear interpolation based on the interpolation ratio.

In a preferred embodiment, the edge detector sequentially sets four pixels close to the pixel to be interpolated to a central pixel and calculates pixel differences between the central pixel and eight pixels around the central pixel to detect an edge between the pixel to be interpolated and the close pixels.

In a preferred embodiment, the threshold value is the minimum threshold value or the maximum threshold value.

In this embodiment, the interpolation ratio calculator calculates an interpolation ratio when a pixel difference closest to the minimum threshold value among the pixel differences belongs to a first quasi-edge decision range. In addition, the interpolation ratio calculator calculates the interpolation ratio when a pixel difference closest to the maximum threshold value among the pixel differences belongs to a second quasi-edge decision range.

The first quasi-edge decision range is larger than the minimum lowest limit value and smaller than the minimum upper limit value at the center of the minimum threshold value. The second quasi-edge decision range is larger than maximum lowest limit value and smaller than the maximum upper limit value at the center of the maximum threshold value.

In a preferred embodiment, a step of linearly interpolating is further included when an edge does not exists between the interpolation pixel and the close pixel.

According to still another feature of the present invention, the interpolation device comprises an edge detector sequentially setting four pixels close to a pixel to be interpolated and calculating pixel differences between a central pixel and eight pixels around the central pixel to detect a temporary edge between the pixel to be interpolated and the close pixels; an edge direction modifier for transforming a temporary edge detected from the edge detector to generate predetermined transformed edge information; an interpolation mix ratio calculator for calculating an interpolation ratio according to a relation of the pixel differences, and the minimum threshold value and the maximum threshold value; a non-linear interpolation coefficient generator for generating a non-linear interpolation coefficient from edge information from the edge direction modifier and the interpolation mix ratio calculator and outputting an edge detection signal showing whether an edge is between the pixel to be interpolated and the close pixels; a linear interpolator for linearly interpolating the pixel to be interpolated; a non-linear interpolator for non-linearly interpolating the pixel to be interpolated referring to the non-linear interpolation coefficient; and a data selector for outputting any one pixel value interpolated in the linear interpolator and the non-linear interpolator as a pixel value of the pixel to be interpolated in response to the edge detection signal.

DETAILED DESCRIPTION OF THE PREFERRED EMBODIMENT

FIG. 1 shows an image signal interpolation device according to a preferred embodiment of the present invention. Referring to FIG. 1, the image signal interpolation device 100 includes an edge detector and a non-linear interpolation coefficient generator 110, a linear interpolator 120, a non-linear interpolator 130 and a data selector 140. The edge detector and non-linear interpolation coefficient generator 110 include an edge detector 111, an edge direction modifier 112, a non-linear interpolation coefficient generator 113, and an interpolation mix ratio calculator 114. The function and operation of the respective component of the image signal interpolation device 100 will be more fully described hereinafter.

Figure 2:
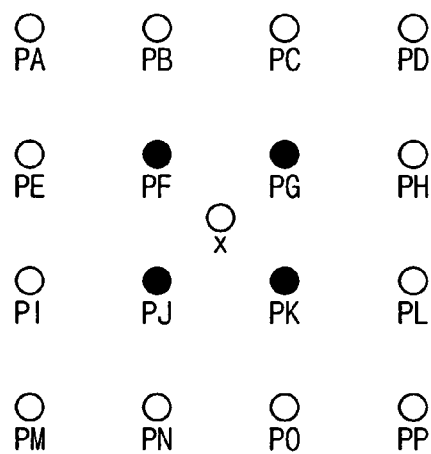
FIG. 2 illustrates operation of an edge detector shown in FIG. 1.

FIG. 2 shows operation the edge detector 111 shown in FIG. 1.

Referring to FIG. 2, the edge detector 111 detects an edge between a pixel X to be interpolated (hereinafter inclusively referred to as "an interpolation pixel") and neighboring pixels PF, PG, PJ and PK. In order to detect the edge, the edge detector 111 determines whether the interpolation pixel X and the neighboring pixels PF, PG, PJ and PK are an edge. The determination method is described as follows.

In advance, the edge detector 111 sequentially sets the neighboring pixels PF, PG, PJ and PK to a central pixel. When the neighboring pixels PF are the central pixels, the edge detector 111 calculates the difference of each of the pixel PF, the neighboring eight pixels PA, PB, PC, PE, PG, PI, PJ and PK. These differences may be calculated by one of mathematical equations 1, 2 and 3.

$$d(i,j)(k,l) = |R(i,j) - R(k,l)| + |G(i,j) - G(k,l)| + |B(i,j) - B(k,l)|$$ [Mathematical equation 1]

$$d(i,j)(k,l) = \{R(i,j) - R(k,l)\}^2 + \{G(i,j) - G(k,l)\}^2 + \{B(i,j) - B(k,l)\}^2$$ [Mathematical equation 2]

$$d(i,j)(k,l) = \max\{|R(i,j) - R(k,l)|, |G(i,j) - G(k,l)|, |B(i,j) - B(k,l)|\}$$ [Mathematical equation 3]

In the above mathematical equations 1 to 3, (i, j) represents a position of the central pixel, (k, l) represents a position of the neighboring pixels, R represents Red, G represents Green, and B represents Blue.

Figure 3:
FIG. 3 illustrates a general standard for determining whether a central pixel is an edge pixel according to calculated pixel differences.

The edge detector 111 determines whether the neighboring pixels PF, PG, PJ and PK are edge pixels or not by comparing the maximum threshold value TH_H and the minimum threshold value TH_L with pixel differences calculated by one of equations 1 to 3. FIG. 3 shows a general standard for determining whether a central pixel is an edge pixel according to calculated pixel differences. In general, in case that all calculated pixel differences are larger or smaller than the maximum threshold value TH_H and minimum threshold value TH_L, the central pixel is determined to be an edge pixel. Otherwise, the central pixel is not determined to be the edge pixel. The reason for this is that only if the central pixel and eight neighboring pixels have remarkable difference or almost same value with respect to the central pixel, is it possible to determine the central pixel to be the edge pixel. In addition, under this determination condition, it is possible to restrain the influence due to a noise component in an image and edge detection in most of natural image changed successively and slowly.

Figure 4:
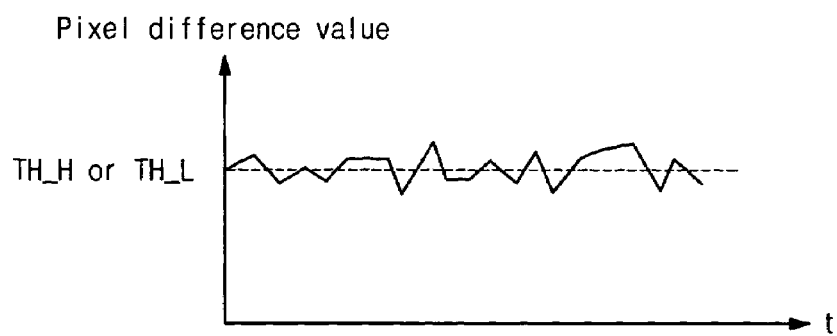
FIG. 4 illustrates an unstable image inputted to the image signal interpolation device of the invention.

As shown in FIG. 4, when an image inputted to the image signal interpolation device is stable, and pixel differences between eight pixels neighboring the central pixel is changed around the minimum threshold value or the maximum threshold value, an edge pixel determination with respect to the neighboring pixels PF, PG, PJ and PK becomes unstable. That is, the neighboring pixels are alternately determined to be an edge pixel and a non-edge pixel. Resultantly, an edge interpolation and linear interpolation are discontinuously performed with respect to the interpolation pixel, so that pixel flicker is generated on a screen.

Accordingly, when the pixel difference for determining whether the pixel difference is about the neighboring pixels or not is around the minimum threshold value or the maximum threshold value, image quality is improved by performing an interpolation through a new method in accordance with the invention.

Figure 5:
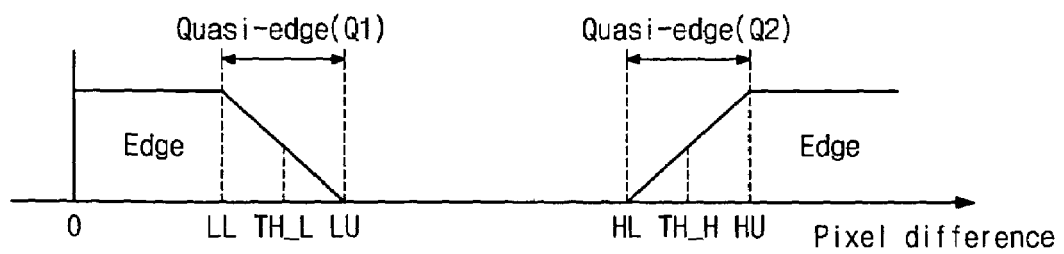
FIG. 5 illustrates a standard of an edge detector for determining whether a pixel to be interpolated X and closing pixels PF, PG, PJ and PK are edge pixels.

FIG. 5 shows a standard of an edge detector 111 determining whether pixels PF, PG, PJ and PK neighboring the interpolation pixel X are edge pixels or not. As previously described, the neighboring pixels PF, PG, PJ and PK are sequentially set to the central pixel, and the difference between eight pixels neighboring the central pixel is calculated. In case that all calculated pixel differences are smaller than the minimum lowest limit value LL or larger than the maximum upper limit value HH, the central pixel is determined to be an edge pixel. In case that a pixel difference closest to the minimum threshold value TH_L among the calculated pixel differences belongs to a first quasi-edge decision range Q1, or a pixel difference closest to the maximum threshold value TH_H belongs to a second quasi-edge decision range Q2, the central pixel is determined to be a quasi-edge pixel. The first quasi-edge decision range Q1 is larger than the minimum lowest limit value LL and smaller than the minimum upper value LU at the center of the minimum threshold value TH_L. The second quasi-edge decision range Q2 is larger than the maximum lowest limit value LU and smaller than the maximum upper value HU at the center of the maximum threshold value TH_H.

A method for determining whether the central pixel is a quasi-edge pixel is more fully described hereinafter. In advance, the differences between eight pixels neighboring the central pixel are calculated. A pixel difference closest to the minimum threshold value TH_L or the maximum threshold value TH_H among the calculated differences is searched. In case that a pixel difference closest to the minimum threshold value TH_L or the maximum threshold value TH_H is between the minimum lowest limit value LL and the minimum upper value LU (Q1), or the maximum lowest value HL and the maximum upper value HU (Q2), the central pixel is determined to be a quasi-edge pixel. Where, LU−LL=HU−HL.

The pixel difference dm closest to the minimum threshold value TH_L or the maximum threshold value TH_H among the calculated differences is provided to the interpolation mix ratio calculator 114.

The interpolation mix ratio calculator 114 calculates an interpolation ratio in response to the minimum pixel difference dm. In advance, when the pixel difference dm is close to the maximum threshold value TH_H, the interpolation mix ratio calculator 114 calculates the interpolation ratio t according to the following mathematical equation 4.

if (dm<HL)t=0 else if (dm HH)t=1 else $t=(dm-HL)*m$         [Mathematical Equation 4]

When the pixel difference dm is close to the minimum threshold value TH_L, the interpolation mix ratio calculator 114 calculates the interpolation ratio t according to the following mathematical equation 5.

if (dm<LL)t=0 else if (dm HH)t=1 else $t=(LU-dm)*m$         [Mathematical Equation 5]

In the above mathematical equations 4 and 5, m represents roll-off of the maximum upper value and the maximum lowest value (1/(HU−HL)) or of the minimum upper value and minimum lowest value (1/(LU−LL)). Where, m's maximum value is 1.

A method for determining whether an interpolation pixel and neighboring pixels are an edge is disclosed in Korean Laid Open Publication No. 2000-59958 entitled, "EDGE DETECTION METHOD IN MIX IMAGE OF GRAPHIC AND NATURAL IMAGE AND EDGE DETECTION DEVICE," the contents of which are incorporated herein in their entirety be reference.

Figure 6:
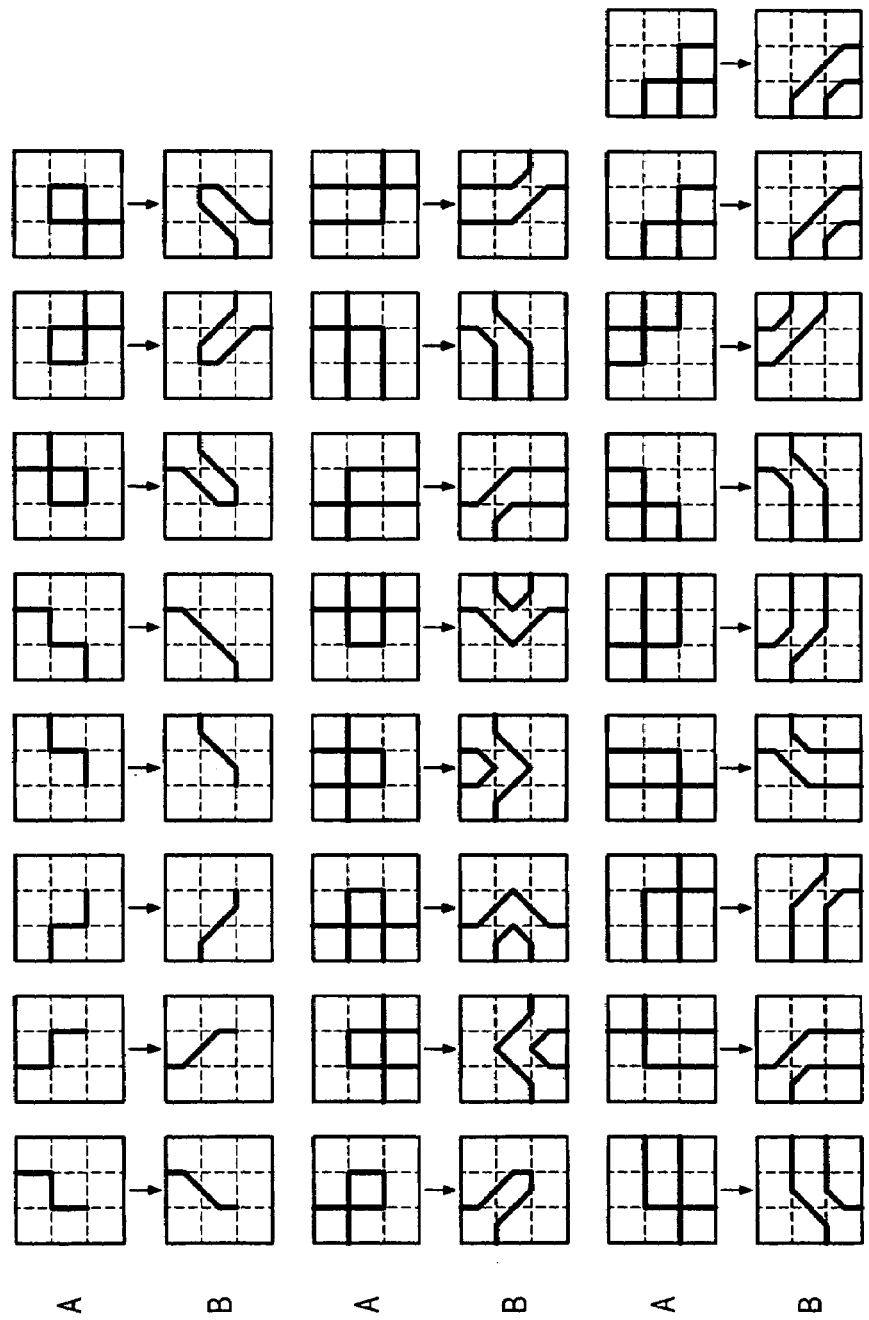
FIG. 6 illustrates a pattern of an edge between a central pixel and eight closing pixels, and a transformed edge pattern.

The edge direction modifier 112 generates predetermined modified edge information MOD_EDG diagonal components on the basis of a pivot of four pixels (top, bottom, right and left) by modifying temporary edge detected from the edge detector 111. The modified edge information MOD_EDG may be classified into a border edge component and a center edge component. The center edge component may be expressed in eight directions including internal horizontal and vertical components, and diagonal components on the basis of the pivot. FIG. 6 shows various patterns to be referred to an edge modification process in the edge direction modifier 112. In particular, resultant patterns of edge modification with respect to 3*3 blocks are shown in FIG. 6. FIG. 6 shows edge patterns detected from the edge detector 111, and B shows modified edge patterns by the edge direction modifier 112. As shown in FIG. 6, most of the edge patterns are modified to diagonal edges. The edge information MOD_EDG is information with respect to the pattern B.

The detailed function of the edge direction modifier 112 is disclosed in Korean Laid Open Publication No. 2002-4246 entitled, "TWO DIMENTIONAL MIX INTERPOLATION DEVICE FOR IMPROVING EDGE AND METHOD FOR THEREOF," the contents of which are incorporated herein in their entirety by reference. Therefore, the description of the edge direction modifier 112 is not repeated herein.

If all modified edge information MOD_EDG is received when four neighboring pixels PF, PF, PJ and PK are respectively set to the central pixel from the edge direction modifier 112, the non-linear coefficient generator 113 generates the edge information MOD_EDG, non-linear interpolation coefficients W_NW, W_NE, W_SW and W_SE, and a selection signal SEL.

Figure 7:
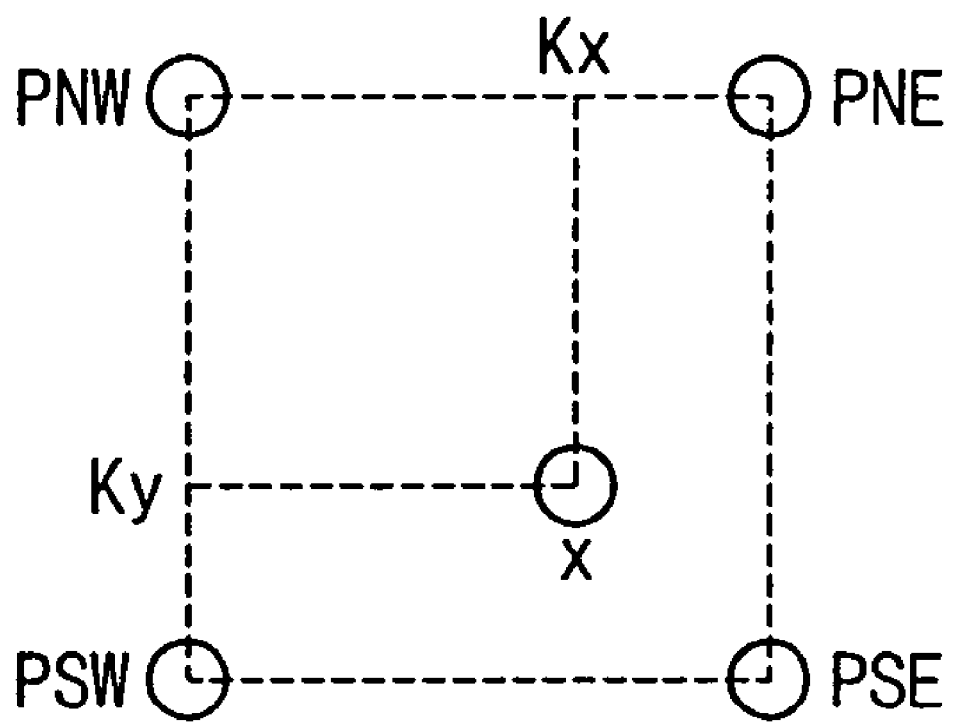
FIG. 7 illustrates the pixel X to be interpolated and four closing pixels PNW, PNE, PSW and PSE.

The non-linear interpolation coefficients are values multiplied by the interpolation pixel X and four neighboring pixels. FIG. 7 shows the interpolation pixel X and four neighboring pixels PNW, PNE, PSW and PSE. The pixel PNW is located in the northwest, the pixel PNE is located in the northeast, the pixel PSW is located in the southwest, and the pixel PSE is located in the southeast at the center of a position (KX, KY) of the interpolation pixel X. In FIG. 2, the pixels PF, PG, PJ and PK neighboring the interpolation pixel X are equivalent to PNW, PNE, PSW and PSE, respectively. The pixel value of the interpolation pixel X is calculated by PNW*(W_NW)+PNE*(W_NE)+PSW*(W_SW)+PSE(W_SE). The non-linear interpolation coefficients W_NW, W_NE, W_SW and W_SE due to the quasi-edge decision are calculated by mathematical equation 6.

$$W\_NW = t(WNWE) + (1-t)WNWB$$

$$W\_NE = t(WNEE) + (1-t)WNEB$$

$$W\_SW = t(WSWE) + (1-t)WSWB$$

$$W\_SE = t(WSEE) + (1-t)WSEB \quad \text{[Mathematical Equation 6]}$$

In the mathematical equation 6, WNWE, WNEE, WSWE and WSEE are edge interpolation coefficients calculated from a position (CX, CY) transformed by coordinate transformation of a position (KX, KY) of the interpolation pixel X, and WNWB, WNEB, WSWB and WSEB are bilinear interpolation coefficients calculated from the position (KX, KY) of the interpolation pixel X. The bilinear interpolation coefficients WNWB, WNEB, WSWB and WSEB are obtained by mathematical equation 7.

$$WNWB = (1-KX)*(1-KY)$$

$$WNEB = KX*(1-KY)$$

$$WSWB = (1-KX)*KY$$

$$WSEB = KX*KY \quad \text{[Mathematical Equation 7]}$$

The non-linear coefficient generator 113 receives the transformed edge information MOD_EDG to set a proto-type center edge. At this time, the proto-type center edge may have six shapes. In addition, the non-linear coefficient generator 113 determines a rotation angle with respect to the proto-type center edge.

FIG. 8 illustrates the proto-type center edge and the rotation angle. The proto-type center edge is classified into six shapes such as corner, perpendicular, full line, cross bar, half line and diagonal.

Referring to (a) to (f) shown in FIG. 8, single, twin and periodic edge types are determined at the center of six edge shapes according to whether they are boundary edge types.

Figure 9:
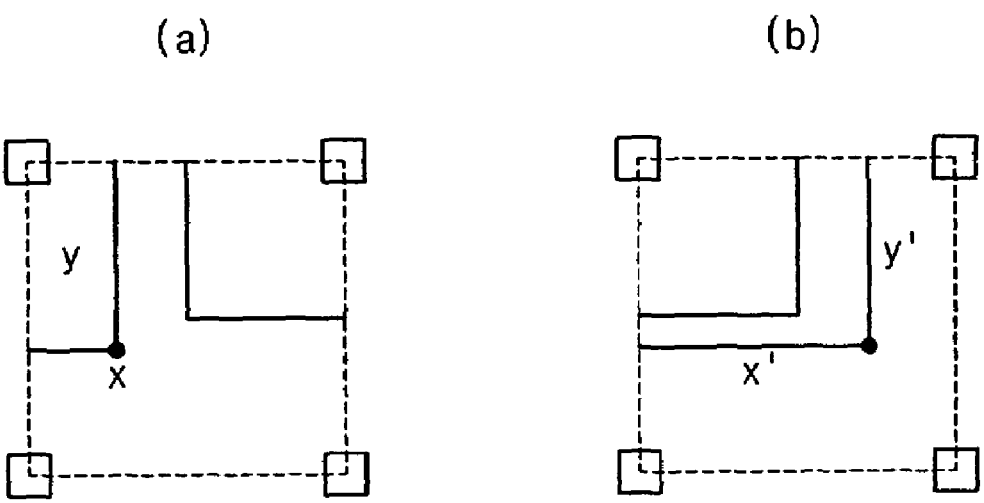
FIG. 9 illustrates a coordinate transformation.

FIG. 9 illustrates a coordinate transformation. In FIG. 9, (a) represents a coordinate (x, y) with respect to an interpolation position (KX, KY) before transformation, and (b) represents a coordinate (x', y') of an interpolation position (CX, CY) with respect to a rotation angle ROT_ANG after transformation. If the rotation angle by the proto-type central edge is determined, the interpolation position is transformed together with coordinate axes.

A generation process of the non-linear interpolation coefficients WNW, WNE, WSE and WSE of the interpolation coefficient generator 113 shown in FIG. 1 is shown in (a) to (f) of FIG. 10.

In mathematical equations 4 to 5, if t=0, the non-linear interpolation coefficients W_NW, W_NE, W_SW and W_SE of FIG. 6 are the same as edge interpolation coefficients WNWE, WNEE, WSWE and WSEE. In addition, in case 0<t<1, the sum of the edge interpolation coefficients WNWE, WNEE, WSWE and WSEE according to an interpolation ratio t and the interpolation coefficients WNWB, WNEB, WSWB and WSEB is determined to the non-linear interpolation coefficients W_NW, W_NE, W_SW and W_SE. The non-linear interpolation coefficients W_NW, W_NE, W_SW and W_SE are provided to the non-linear interpolator 130. In the meanwhile, the non-linear interpolation coefficient generator 113 determines whether an edge is between the interpolation pixel X and the neighboring pixels PF, PG, PJ and PK from the transformed edge information MOD_EDG. If there is the edge, the non-linear interpolation coefficient generator 113 activates the edge detection signal DET_EDG.

Figure 11:
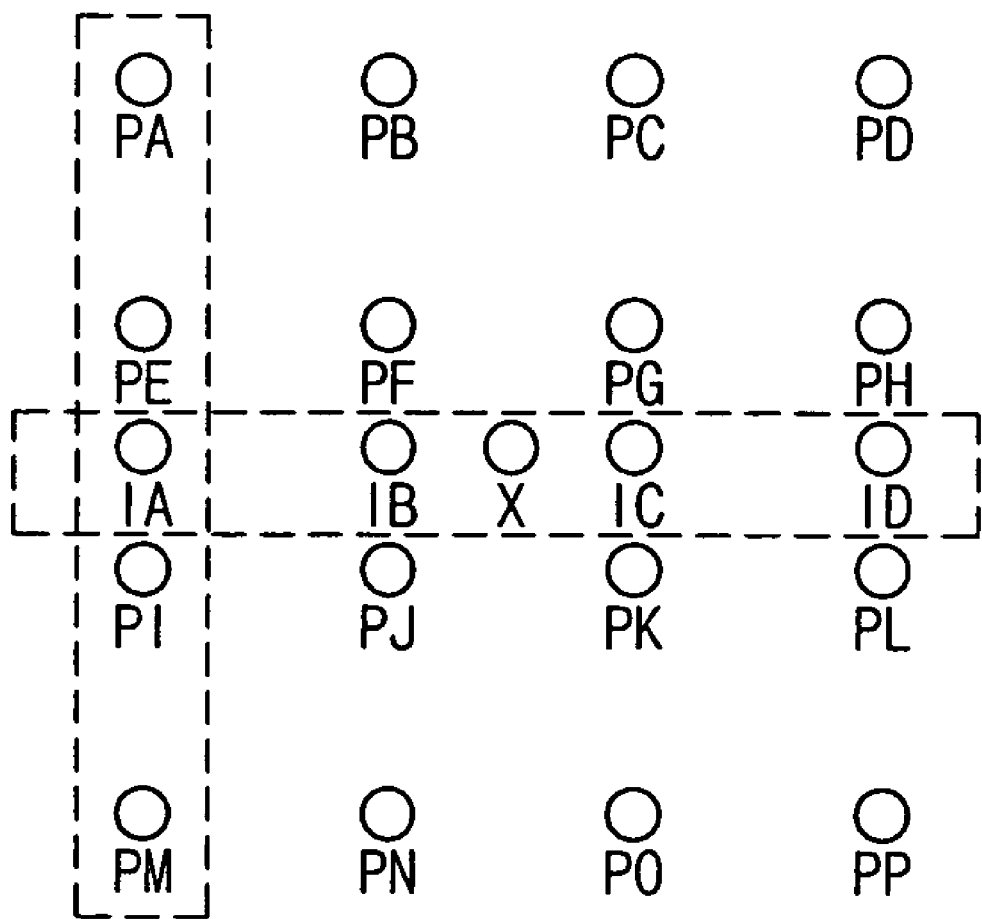
FIG. 11 illustrates a 4-tap linear interpolation method.

Referring to FIG. 1 again, the linear interpolation 120 linearly interpolates the interpolation pixel X from an inputted image signal. FIG. 11 shows a linear interpolation method. Referring to FIG. 11, sixteen pixels (4*4) PA~PP are requested to a 4-tab linear interpolation. In advance, the linear interpolation is vertically performed to generate the interpolated pixels IA, IB, IC and ID. And, it is possible to obtain an interpolation value of a pixel X to be interpolated by performing a horizontal interpolation from the interpolated pixels IA, IB, IC and ID.

As shown in FIG. 2, the non-linear interpolator 130 obtains a pixel value X of the interpolation pixel by respectively multiplying the non-linear coefficients four neighboring pixels PF, PG, PJ and PK by the non-linear coefficients W_NW, W_NE, W_SW and W_SE.

The selector 140 outputs one of pixel values from the linear interpolator 120 and the non-linear interpolator 130 as a pixel value of the interpolation pixel X in response to the edge detection signal DET_EDG. That is, when the edge detection signal DET_EDG is in an inactivated-state, meaning an edge non-detection, a pixel value from the linear interpolator 120 is outputted as an interpolation pixel X. When the edge detection signal DET_EDG is in an activated state, meaning an edge detection, a pixel value from the non-linear interpolator 130 is outputted as an interpolation signal.

Figure 12:
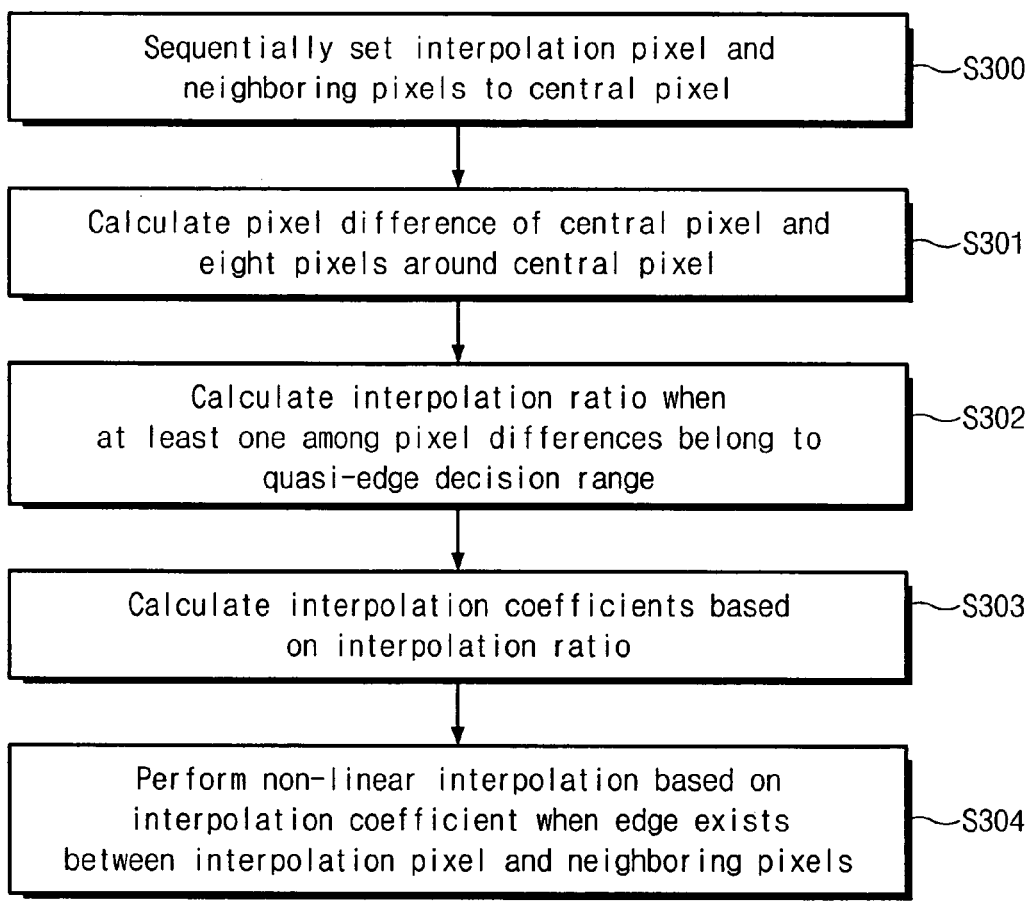
FIG. 12 is a flowchart showing an interpolation method according to a preferred embodiment of the present invention when the pixel value of the pixel to be interpolated X and four closing pixels are trembled on the basis of a predetermined level.

FIG. 12 is a flowchart showing an interpolation method according to a preferred embodiment of the present invention when the value of the interpolation pixel X and four closing pixels are trembled on the basis of a predetermined level.

In advance, as shown in FIG. 2, the interpolation pixel X and four neighboring pixels PF, PG, PJ and PK are sequentially set to a central pixel in step S300. In step S301, a pixel difference of a central pixel and eight pixels around the central pixel is calculated. That is, when the central pixel is PF, eight pixels are PA, PB, PC, PE, PG, PI, PJ and PK. In step S302, when a pixel difference closest to the minimum threshold among pixel differences belongs to a second quasi-edge decision range Q2, an interpolation ratio t is calculated. The interpolation ratio t is a mix ratio of the edge interpolation and bilinear interpolation. In step S303, the interpolation coefficients W_NW, W_NE, W_SW and W-SE are calculated based on the interpolation ratio t. In step S304, when an edge exists between the interpolation pixel X and the neighboring pixels, the non-linear interpolation is performed based on the interpolation coefficient.

According to the present invention, when the pixel value of the interpolation pixel X and four closing pixels are trembled on the basis of a predetermined level, the interpolation coefficient is calculated, and the interpolation is performed based on the interpolation ratio t. Therefore, the interpolation pixel and neighboring pixels are discontinuously determined to be the edge pixel and non-edge pixel, so that the interpolation pixel is discontinuously interpolated by the linear and non-linear interpolation methods. Resultalty, it is possible to prevent image quality from being degraded.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An interpolation method, comprising:
    sequentially setting a plurality of pixels close to a pixel to be interpolated to a central pixel, wherein, in the step of setting the central pixel, four pixels around the pixel to be interpolated are sequentially set to the central pixel;
    calculating pixel differences between the central pixel and a plurality of pixels around the central pixel, wherein, in the step of calculating the pixel differences, the central pixel and eight pixels around the central pixel are respectively calculated;

calculating an interpolation ratio when a pixel difference closest to a threshold value among the pixel differences belongs to a quasi-edge decision range to determine whether the central pixel is a quasi-edge pixel, wherein the threshold value is one of a maximum threshold value and a minimum threshold value, wherein a first quasi-edge decision range is larger than a minimum lowest limit value and smaller than a minimum upper limit value at a center of minimum threshold value;

calculating an interpolation coefficient based on the interpolation ratio; and interpolating the pixel to be interpolated based on the interpolation coefficient when an edge exists between the interpolation pixel and the close pixels, wherein an interpolation ratio is calculated when a pixel difference closest to the minimum threshold value among the pixel differences belongs to the first quasi-edge decision range in the step of calculating the interpolation ratio, wherein when the pixel difference closest to the minimum threshold value among the pixel differences is larger than the minimum lowest limit value and smaller than the minimum upper value, the interpolation ratio is $(TH\_L+LU-dm)*m$ where, TH_L represents the minimum threshold value, LU represents the minimum upper limit value, dm represents a pixel difference closest to the minimum threshold value, and m represents a roll-off of the upper limit value and the lowest limit value, wherein, in the interpolation step, the pixel value of the interpolation pixel is $PNW*(W\_NW)+PNE*(W\_NE)+PSW*(W\_SW)+PSE*(W\_SE)$, where, PNW, PNE, PSW and PSE are four pixels close to the pixel to be interpolated, and W_NW, W_NE, W_SW and W_SE are interpolation coefficients, which are calculated in the step of calculating the interpolation coefficient, wherein the interpolation coefficients W_NW, W_NE, W_SW and W_SE are $W\_NW=t(WNWE)+(1-t)WNWB$ $W\_NE=t(WNEE)+(1-t)WNEB$ $W\_SW=t(WSWE)+(1-t)WSWB$ $W\_SE=t(WSEE)+(1-t)WSEB$ where, t represents a mixing ratio calculated in the step of calculating the mixing interpolation ratio, WNWE, WNEE, WSWE and WSEE are edge interpolation coefficients calculated from a position of a coordinate transformation of the interpolation pixel, WNWB, WNEB, WSWB and WSEB are bilinear interpolation coefficients, and the bilinear interpolation coefficients are $WNWB=(1-KX)*(1-KY)$ $WNEB=KX*(1-KY)$ $WSWB=(1-KX)*KY$ $WSEB=KX*KY$ where, KX and KY are respectively a position of a pixel to be interpolated.

2. The interpolation method of claim 1, wherein a second quasi-edge decision range is larger than the maximum lowest limit value and smaller than the maximum upper limit value at the center of the maximum threshold value, and wherein an interpolation ratio is calculated when a pixel difference closest to the maximum threshold value among the pixel differences belongs to the second quasi-edge decision range in the step of calculating the interpolation ratio.

3. The interpolation method of claim 2, wherein when the pixel difference closest to the minimum threshold value among the pixel differences is larger than the minimum lowest limit value and smaller than the maximum upper value, the edge interpolation ratio is $(TH\_H+HL-dm)*m$ where, TH_H represents the maximum threshold value, HL represents the lowest limit value, dm represents a pixel difference closest to the maximum threshold value, and m represents a roll-off of the upper limit value and the lowest limit value.

4. The interpolation method of claim 1, wherein the mixing ratio (t) is 1 in a case that a pixel difference closest to the minimum threshold value among the pixel differences is the same as or smaller than the minimum lowest limit value, and wherein the mixing ratio (t) is 0 in the case that a pixel difference closest to the minimum threshold value among the pixel differences is smaller than the maximum lowest limit value.

5. The interpolation method of claim 1, wherein in the case that a pixel difference closest to the maximum threshold value among the pixel differences is larger than or the same as the maximum upper limit value, the mixing ratio (t) is 1, and wherein in case that a pixel difference closest to the maximum threshold value among the pixel differences is larger than the maximum upper limit value, the mixing ratio (t) is 0.

6. The interpolation method of claim 1, further comprising a step of linearly interpolating the pixels when an edge does not exist between the pixel to be interpolated and the close pixel.

7. An interpolation device, comprising:

an edge detector for sequentially setting a plurality of pixels close to a pixel to be interpolated and calculating pixel differences between a central pixel and a plurality of pixels around the central pixel to detect an edge between the pixel to be interpolated and the close pixels, wherein the edge detector sequentially sets four pixels close to the pixel to be interpolated to a central pixel and calculates pixel differences between the central pixel and eight pixels around the central pixel to detect an edge between the pixel to be interpolated and the close pixels;

an interpolation mix ratio calculator for calculating an interpolation ratio when a pixel difference closest to a threshold value among the pixel differences belongs to a quasi-edge decision range to determine whether the central pixel is a quasi-edge pixel, wherein the interpolation mix ratio calculator calculates the interpolation ratio being a mixing ratio of the edge interpolation and the bilinear interpolation according to the distance of a pixel difference closest to the threshold value among the pixel differences and the threshold value, wherein the threshold value is one of a minimum threshold value and a maximum threshold value, wherein the quasi-edge decision range is larger than a minimum lowest limit value and smaller than a minimum upper limit value at a center of the minimum threshold value, wherein when the pixel difference the closest to the minimum threshold value among the pixel differences is larger than the minimum lowest limit value and smaller than the minimum upper value, the interpolation ratio is (TH_L+LU−dm)*m where, TH_L represents the minimum threshold value, LU represents the minimum upper limit value, dm represents a pixel difference closest to the minimum threshold value, and m represents a roll-off of the upper limit value and the lowest limit value; and a non-linear interpolator for interpolating the pixel to be interpolated by mixing an edge interpolation and a bilinear interpolation based on the interpolation ratio, wherein the non-linear interpolator outputs PNW*(W_NW)+PNE*(W_NE)+PSW*(W_SW)+PSE*(W_SE) to an interpolation value of the pixel to be interpolated where, PNW, PNE, PSW and PSE are four pixels close to the pixel to be interpolated, and W_NW, W_NE, W_SW and W_SE are interpolation coefficients, which are calculated in the step of calculating the interpolation coefficient, wherein the interpolation coefficients W_NW, W_NE, W_SW and W_SE are $W\_NW=t(WNWE)+(1-t)WNWB$ $W\_NE=t(WNEE)+(1-t)WNEB$ $W\_SW=t(WSWE)+(1-t)WSWB$ $W\_SE=t(WSEE)+(1-t)WSEB$ where, t represents a mixing ratio calculated in the step of calculating the mixing ratio, WNWE, WNEE, WSWE and WSEE are edge interpolation coefficients calculated from a position of a coordinate transformation of the interpolation pixel, WNWB, WNEB, WSWB and WSEB are bilinear interpolation coefficients, and the bilinear interpolation coefficients are $WNWB=(1-KX)*(1-KY)$ $WNEB=KX*(1-KY)$ $WSWB=(1-KX)*KY$ $WSEB=KX*KY$ where, KX and KY are respectively a position of a pixel to be interpolated.

8. The interpolation method of claim 7, wherein the quasi-edge decision range is larger than the maximum lowest limit value and smaller than the maximum upper limit value at the center of the maximum threshold value.

9. The interpolation method of claim 8, wherein when the pixel difference the closest to the maximum threshold value among the pixel differences is larger than the maximum lowest limit value and smaller than the maximum upper value, the edge interpolation ratio is (TH_L+HL−dm)*m where, TH_L represents the maximum threshold value, HL represents the lowest limit value, dm represents a pixel difference closest to the maximum threshold value, and m represents a roll-off of the upper limit value and the lowest limit value.

10. The interpolation device of claim 7, wherein the mixing ratio (t) is 1 in the case that a pixel difference closest to the minimum threshold value among the pixel differences is the same as or smaller than the minimum lowest limit value, and wherein the mixing ratio (t) is 0 in the case that a pixel difference closest to the minimum threshold value among the pixel differences is smaller than the maximum lowest limit value.

11. The interpolation device of claim 10, wherein in the case that a pixel difference closest to the maximum threshold value among the pixel differences is larger than or the same as the maximum upper limit value, the mixing ratio (t) is 1, and wherein in the case that a pixel difference closest to the maximum threshold value among the pixel differences is larger than the maximum upper limit value, the mixing ratio (t) is 0.

12. The interpolation device system of claim 7, further comprising a step of linearly interpolating when an edge does not exist between the pixel to be interpolated and the close pixel.

13. An interpolation method, comprising:

sequentially setting a plurality of pixels close to a pixel to be interpolated to a central pixel, wherein in setting the central pixel, four pixels around the pixel to be interpolated are sequentially set to the central pixel;

calculating pixel differences between the central pixel and a plurality of pixels around the central pixel, wherein, in calculating the pixel difference, the central pixel and eight pixels around the central pixel are respectively calculated;

calculating an interpolation ratio when a pixel difference closest to a threshold value among the pixel differences belongs to a quasi-edge decision range, wherein the threshold value is one of a maximum threshold value and a minimum threshold value;

calculating an interpolation coefficient based on the interpolation ratio; and interpolating the pixel to be interpolated based on the interpolation coefficient when an edge exists between the interpolation pixel and the close pixels, wherein a first quasi-edge decision range is larger than a minimum lowest limit value and smaller than a minimum upper limit value at a center of minimum threshold value, and wherein an interpolation ratio is calculated when a pixel difference closest to the minimum threshold value among the pixel differences belongs to the first quasi-edge decision range in the step of calculating the interpolation ratio, wherein when the pixel difference closest to the minimum threshold value among the pixel differences is larger than the minimum lowest limit value and smaller than the minimum upper value, the interpolation ratio is (TH_L+LU−dm)*m where, TH_L represents the minimum threshold value, LU represents the minimum upper limit value, dm represents a pixel difference closest to the minimum threshold value, and m represents a roll-off of the upper limit value and the lowest limit value, wherein, in the interpolation step, the pixel value of the interpolation pixel is PNW*(W_NW)+PNE*(W_NE)+PSW*(W_SW)+PSE*(W_SE);

where, PNW, PNE, PSW and PSE are four pixels close to the pixel to be interpolated, and W_NW, W_NE, W_SW and W_SE are interpolation coefficients, which are calculated in the step of calculating the interpolation coefficient.

14. The interpolation method of claim 13, wherein the interpolation coefficients W_NW, W_NE, W_SW and W_SE are $$W\_NW = t(WNWE) + (1-t)WNWB$$

$$W\_NE = t(WNEE) + (1-t)WNEB$$

$$W\_SW = t(WSWE) + (1-t)WSWB$$

$$W\_SE = t(WSEE) + (1-t)WSEB$$

where, t represents a mixing ratio calculated in the step of calculating the interpolation ratio, WNWE, WNEE, WSWE and WSEE are edge interpolation coefficients calculated from a position of a coordinate transformation of the interpolation pixel, WNWB, WNEB, WSWB and WSEB are bilinear interpolation coefficients, and the bilinear interpolation coefficients are $$WNWB = (1-KX)*(1-KY)$$

$$WNEB = KX*(1-KY)$$

$$WSWB = (1-KX)*KY$$

$$WSEB = KX*KY$$

where, KX and KY are respectively a position of a pixel to be interpolated.

15. An interpolation device, comprising:

an edge detector for sequentially setting a plurality of pixels close to a pixel to be interpolated and calculating pixel differences between a central pixel and a plurality of pixels around the central pixel to detect an edge between the pixel to be interpolated and the close pixels, wherein the edge detector sequentially sets four pixels close to the pixel to be interpolated to a central pixel and calculates pixel differences between the central pixel and eight pixels around the central pixel to detect an edge between the pixel to be interpolated and the close pixel;

an interpolation mix ratio calculator for calculating an interpolation ratio when a pixel difference closest to a threshold value among the pixel differences belongs to a quasi-edge decision range, wherein the interpolation mix ratio calculator calculates the interpolation ratio being a mixing ratio of the edge interpolation and the bilinear interpolation according to the distance of a pixel difference closest to the threshold value among the pixel differences and the threshold value, wherein the threshold value is one of a minimum threshold value and a maximum threshold value, wherein the quasi-edge decision range is larger than a minimum lowest limit value and smaller than a minimum upper limit value at a center of the minimum threshold value, wherein when the pixel difference the closest to the minimum threshold value among the pixel differences is larger than the minimum lowest limit value and smaller than the minimum upper value, the edge interpolation ratio is $$(TH\_L + LU - dm)*m$$

where, TH_L represents the minimum threshold value, LU represents the minimum upper limit value, dm represents a pixel difference closest to the minimum threshold value, and m represents a roll-off of the upper limit value and the lowest limit value; and a non-linear interpolator for interpolating the pixel to be interpolated by mixing an edge interpolation and a bilinear interpolation based on the interpolation ratio, wherein the non-linear interpolator outputs PNW*(W_NW)+PNE*(W_NE)+PSW*(W_SW)+PSE*(W_SE) to an interpolation value of the pixel to be interpolated where, PNW, PNE, PSW and PSE are four pixels close to the pixel to be interpolated, and W_NW, W_NE, W_SW and W_SE are interpolation coefficients, which are calculated in the step of calculating the interpolation coefficient.

16. The interpolation device of claim 15, wherein the interpolation coefficients W_NW, W_NE, W_SW and W_SE is $$W\_NW = t(WNWE) + (1-t)WNWB$$

$$W\_NE = t(WNEE) + (1-t)WNEB$$

$$W\_SW = t(WSWE) + (1-t)WSWB$$

$$W\_SE = t(WSEE) + (1-t)WSEB$$

where, t represents a mixing ratio calculated in the step of calculating the mixing ratio, WNWE, WNEE, WSWE and WSEE are edge interpolation coefficients calculated from a position of a coordinate transformation of the interpolation pixel, WNWB, WNEB, WSWB and WSEB are bilinear interpolation coefficients, and the bilinear interpolation coefficients are $$WNWB = (1-KX)*(1-KY)$$

$$WNEB = KX*(1-KY)$$

$$WSWB = (1-KX)*KY$$

$$WSEB = KX*KY$$

where, KX and KY are respectively a position of a pixel to be interpolated.

* * * * *